(12) United States Patent
Whittingham

(10) Patent No.: US 9,936,649 B2
(45) Date of Patent: Apr. 10, 2018

(54) GROW LIGHT SYSTEMS AND METHODS FOR CONTROLLING THE SAME

(71) Applicant: Global Energy & Lighting, Inc., Eagle, ID (US)

(72) Inventor: Michael Whittingham, Los Gatos, CA (US)

(73) Assignee: GLOBAL ENERGY & LIGHTING, INC., Eagle, ID (US)

( * ) Notice: Subject to any disclaimer, the term of this patent is extended or adjusted under 35 U.S.C. 154(b) by 0 days.

(21) Appl. No.: 15/357,345

(22) Filed: Nov. 21, 2016

(65) Prior Publication Data

US 2017/0135289 A1    May 18, 2017

Related U.S. Application Data

(63) Continuation of application No. 14/819,840, filed on Aug. 6, 2015, now Pat. No. 9,497,905.

(60) Provisional application No. 62/033,812, filed on Aug. 6, 2014.

(51) Int. Cl.
*A01G 7/04* (2006.01)
*H05B 41/38* (2006.01)
*H05B 33/08* (2006.01)

(52) U.S. Cl.
CPC ......... *A01G 7/045* (2013.01); *H05B 33/0854* (2013.01); *H05B 33/0872* (2013.01); *H05B 41/38* (2013.01)

(58) Field of Classification Search
CPC . A01G 7/045; A01G 7/04; A01G 7/06; H05B 37/02; H05B 33/0842; H05B 33/0845; H05B 41/38; H05B 33/0854; F21Y 2113/00; F21Y 2115/10; F21Y 2101/00; Y02P 60/146; Y02P 60/149; Y10S 362/80
USPC ........ 362/231, 293, 800, 805; 315/152, 297, 315/307, 312, 362

See application file for complete search history.

(56) References Cited

U.S. PATENT DOCUMENTS

| | | | |
|---|---|---|---|
| 7,202,613 B2 * | 4/2007 | Morgan | A01M 1/04 315/312 |
| 8,143,811 B2 * | 3/2012 | Shloush | H05B 37/0218 315/297 |
| 8,458,954 B2 | 6/2013 | Yamada et al. | |
| 8,714,774 B2 | 5/2014 | Dubuc | |
| 9,060,468 B2 | 6/2015 | Klase et al. | |
| 9,101,096 B1 | 8/2015 | Lewis | |
| 9,137,874 B2 | 9/2015 | Maxik et al. | |
| 9,250,681 B2 | 2/2016 | Chang | |
| 9,497,905 B2 * | 11/2016 | Whittingham | A01G 7/045 |
| 2007/0058368 A1 | 3/2007 | Partee et al. | |
| 2009/0288340 A1 * | 11/2009 | Hess | A01G 9/26 47/58.1 LS |
| 2012/0287617 A1 | 11/2012 | Mekhtarian | |
| 2015/0351325 A1 * | 12/2015 | Shelor | H05B 33/0854 47/58.1 LS |

\* cited by examiner

*Primary Examiner* — Haissa Philogene
(74) *Attorney, Agent, or Firm* — Van Court & Aldridge LLP

(57) ABSTRACT

Grow light systems and methods for controlling the systems are described herein. The grow light system can include an integrated lamp and light emitting diodes (LEDs) structure that produces an energy signature highly conducive to plant growth, and that uses minimal energy.

16 Claims, 7 Drawing Sheets

GROW LIGHT SYSTEMS AND METHODS FOR CONTROLLING THE SAME

CROSS-REFERENCE TO RELATED APPLICATION

This application is a continuation of U.S. patent application Ser. No. 14/819,840, filed Aug. 6, 2015 (now U.S. Pat. No. 9,497,905), which claims the benefit of U.S. Provisional Patent Application No. 62/033,812, filed Aug. 6, 2014, the disclosures of which are incorporated herein in their entirety.

TECHNICAL FIELD

This patent specification relates to grow light systems and methods for controlling the same. More particularly, this patent specification relates to integrated lamp and LED light systems and the control thereof for maximizing grow potential of plant matter.

BACKGROUND

Plants such as trees, crops, bushes, and other matter the use photosynthesis have evolved to grow in response to natural light provided by the sun. When plants are grown indoors or other location that inhibits access to natural light, the growing potential is hampered. Artificial light has been used to grow plants, but in order to achieve, at best, marginal results, these attempts require a substantial amount of energy and produce high quantities of heat. What is needed is a system that minimizes energy requirements, eliminates excessive heat, and produces an energy signature highly conducive to plant growth.

SUMMARY

Grow light systems and methods for controlling the systems are described herein. The grow light system can include an integrated lamp and light emitting diodes (LEDs) structure that produces an energy signature highly conducive to plant growth, and that uses minimal energy.

A further understanding of the nature and advantages of the embodiments discussed herein may be realized by reference to the remaining portions of the specification and the drawings.

DETAILED DESCRIPTION OF THE DISCLOSURE

Figure 1:
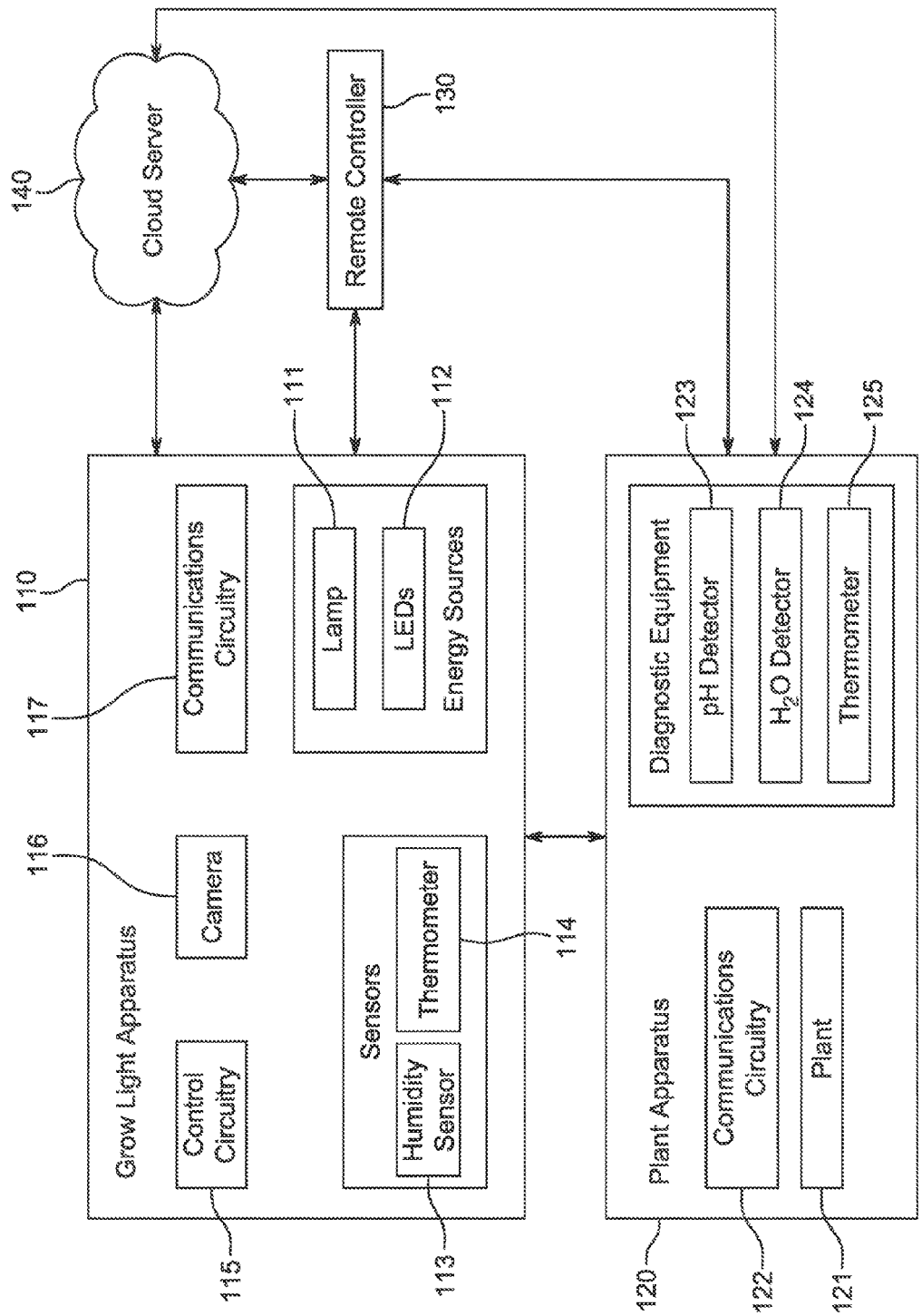
FIG. 1 is an illustrative grow light system, according to some embodiments.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Grow light systems and methods for controlling the systems are described herein. The grow light system can include an integrated lamp and light emitting diodes (LEDs) structure that produces an energy signature highly conducive to plant growth and product yield, and that uses minimal energy. The grow light system may simultaneously operate both the lamp and the LEDs to produce a combined energy profile that characterizes the energy output of the light system. In some embodiments, the energy output of the light system may represent electromagnetic energy output, with emphasis on one or more of the infrared, visible, and ultraviolet spectrums.

The lamp may exhibit a lamp energy profile and the LEDs may exhibit a LED energy profile. The lamp energy profile may exhibit a broad spectrum of energy at varying levels, whereas the LED energy profile may exhibit narrow spectrum(s) of energy at varying levels. The combined energy profile exhibits the best of both the lamp and LED energy profiles. The lamp energy profile may remain relatively fixed throughout its operational life, though the intensity of its output may be changed (e.g., from 35-100% of intensity). The LED energy profile can be changed as desired by controlling the energy output of the LEDs. For example, the LEDs can be controlled to provide one or more specific ranges of energy to supplement the energy output of the lamp. For example, the lamp energy profile may be relatively deficient in a particular range of wavelengths (e.g., wavelengths associated the color red in the visible spectrum). To compensate for that deficiency, the LEDs can be controlled to provide that particular range of wavelengths. The LEDs can be controlled to provide multiple ranges of wavelengths to compensate for any of the lamp's deficiencies. This results in a combined energy profile that more closely resembles the energy profile of the sun than either the lamp or the LEDs can independently produce.

FIG. 1 is an illustrative grow light system 100 including grow light apparatus 110, plant apparatus 120, remote controller 130, and cloud server 140 in accordance with some embodiments. Grow light apparatus 110 can project energy (e.g., light energy) on to plant apparatus 120. Apparatus 1110 may be mounted to a movable structure (not shown) that can position apparatus 110 at different heights relative to plant apparatus 120. Apparatus 110 can include energy sources such as lamp 111 and LEDs 112, sensors such as humidity sensor 113 and thermometer 114, control circuitry 115, camera 116, and communications circuitry 117. It is understood some of the components are optional and that other components not shown can be included. Lamp 111 can be a high intensity discharge (HID) lamp or an incandescent lamp. For example, HID lamps can include mercury-vapor lamps, metal-halide lamps, ceramic metal-halide lamps, sodium-vapor lamps, and xenon short-arc lamps. In one embodiment, apparatus 110 may contain only one lamp (e.g., a single HID lamp). In other embodiments, apparatus 110 may contain more than one lamp. Limiting to one lamp may limit power consumption.

LEDs 112 can include a multitude of LEDS. The LEDs can include multiple arrays of LEDs. In one embodiment, the LEDs may be configurable to emit energy at any frequency range. In another embodiment, the LEDs may be operable to emit energy at a fixed frequency. In this embodiment, a different assortment LEDs may be used to provide energy at desired frequencies.

Humidity sensors 113 can be any suitable device that measure humidity such as relative humidity. Thermometer 114 can be any suitable device capable of measuring the temperature. Camera 116 can be any digital camera that can capture digital images. Camera 116 may be mounted to apparatus such that it can take pictures of plant apparatus 120. If desired, multiple cameras may be used to obtain image data of the plant. This image data can provide information on the plant, for example, such as plant height and grow mass. For example, two or more cameras can be used to obtain a three-dimensional image of the plant.

Control circuitry 115 may control the operation of apparatus 110. For example, circuitry 115 can control operation of lamp 111, LEDs 112, the sensors, camera 116, and communications circuitry 117. As will be explained in more detail below, control circuitry 115 can control simultaneous operation of lamp 111 and LEDs 112 to produce a combined energy profile that characterizes the energy output of the light apparatus. Communications circuitry 117 may enable apparatus to communicate with plant apparatus 120, remote controller 130, and cloud server 140 over a wired or wireless link.

Plant apparatus 120 can include one more plants 121 (only one is shown to avoid overcrowding the figure), communications circuitry 122, and diagnostics equipment such as PH detector 123, moisture detector 124, and thermometer 125. In one embodiment plant apparatus can be simplified to only include plant 121. Plant 121 can include any suitable plant that receives light energy from light apparatus 110. PH detector 123 can detect the PH of the soil containing plant 121. Moisture detector 124 can detect the water content of plant 121, and thermometer 125 can detect the temperature of the soil containing the plant, or the ambient air surround the plant. Communications circuitry 122 can communicate data with apparatus 110, remote controller 130, and cloud server 140.

Remote controller 130 can communicate with light apparatus 110, plant apparatus 120, and cloud server 140. Remote controller 130 may provide user interface controls and monitoring functions to a user. For example, a user may control the operation of apparatus 110 using remote controller 130. As another example, remote controller 130 can relay information from apparatus 110 or apparatus 120 to cloud server 140 and vice versa.

Cloud server 140 may communicate with apparatus 110, apparatus 120, and remote server 130. Cloud server 140 may provide additional processing power and/or instructions for control circuitry 115.

Figure 2A:
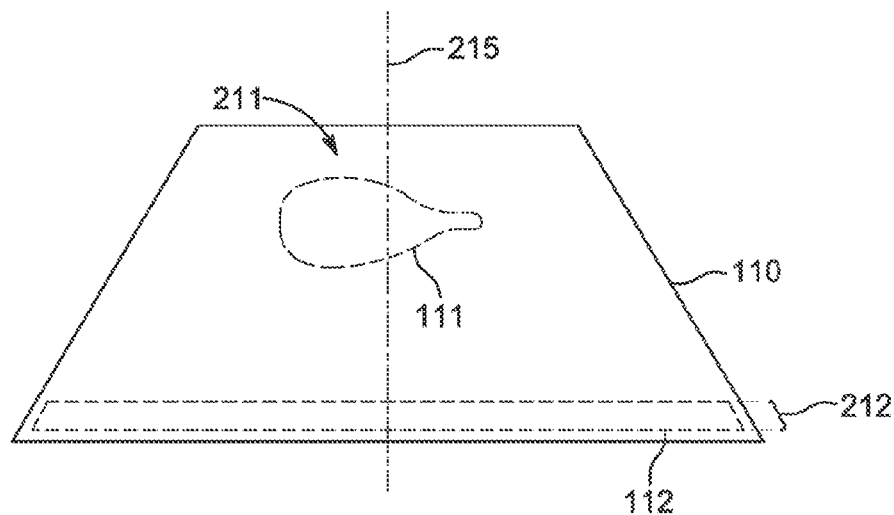
FIGS. 2A-2C show different views of an illustrative light apparatus, according to some embodiments.
Figure 2B:
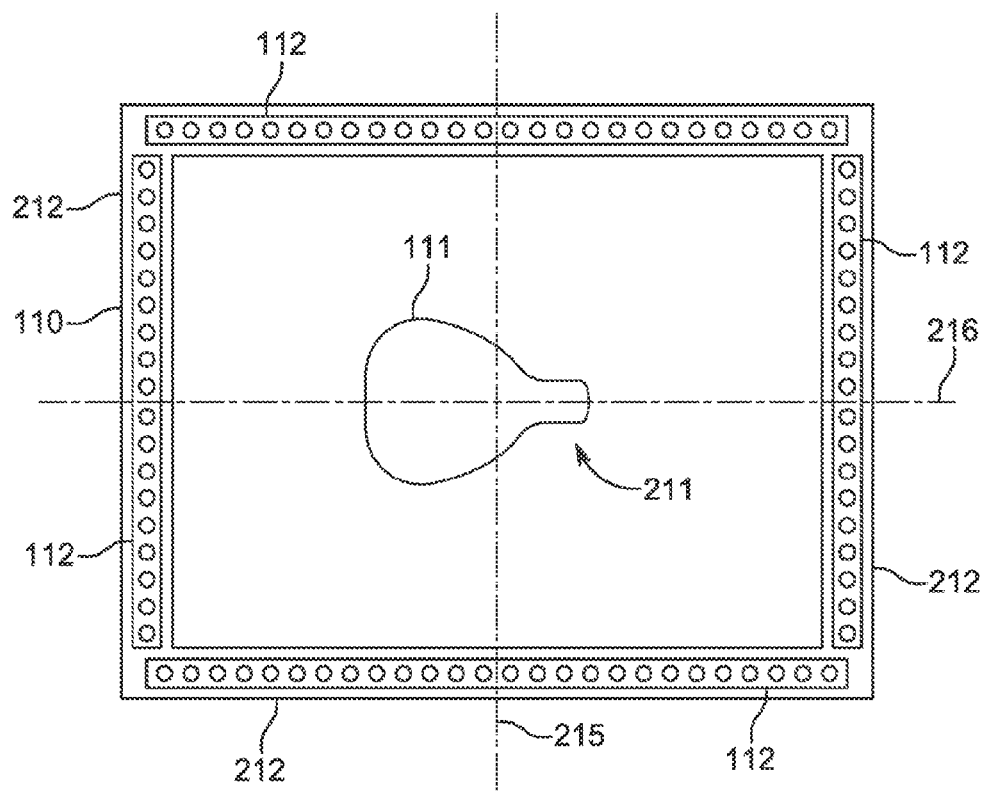

FIGS. 2A and 2B show illustrative side and bottom views, respectively, of light apparatus 100 according to various embodiments. As shown, light apparatus 100 may have a hollowed out trapezoidal structure in which lamp 111 is mounted in center portion 211 and LEDs 112 are mounted in outer portion 212. It is understood that the shape of the structure can take any suitable shape and not limited to trapezoids as shown. Center portion 211 may be located near a first side (e.g., top) of the structure and outer portion 212 may be located near a second side (e.g., bottom) of the structure. In addition, center portion 211 may be centered along axes 215 and 216, whereas outer portion may be located adjacent to, but distal from, axes 215 and 216.

Figure 2C:
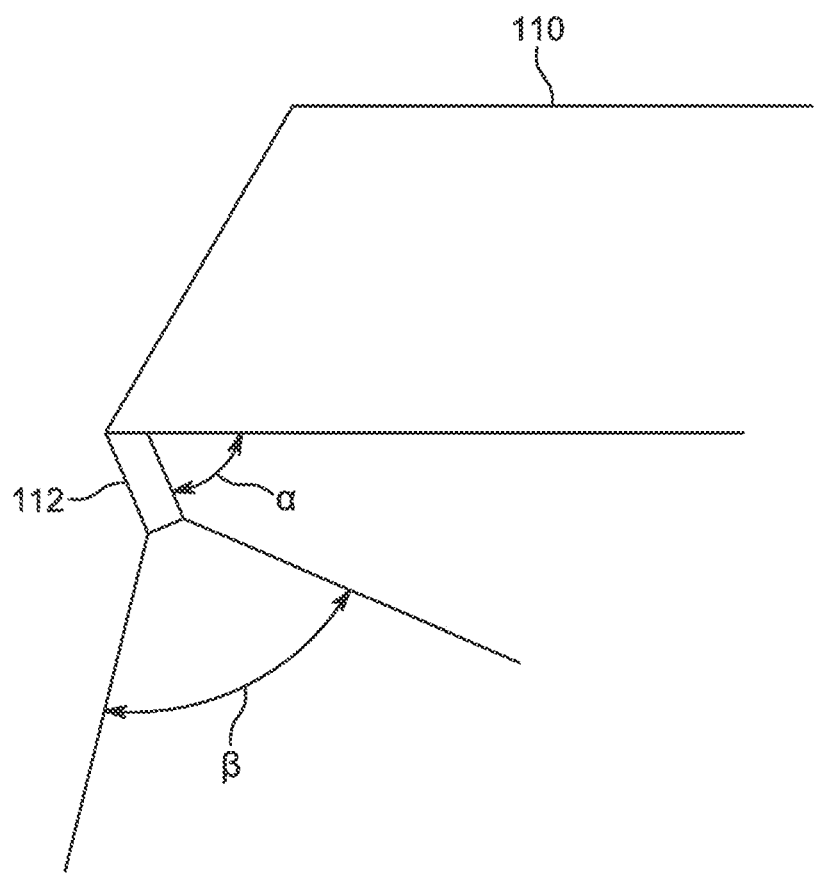

LEDs 112 are shown mounted to the structure as a single row of LEDs. This is merely illustrative. If desired, multiple rows of LEDS may be provided. Since LEDs typically have a relatively focused energy beam, the LEDs may be canted inwards towards one of the center axes 215 or 216 to maximize energy concentration directly below apparatus 110. For example, FIG. 2C shows partial view of apparatus 110 with exaggerated emphasis of the mounting position of LED 112. As shown, LED is canted inwards at angle, $\alpha$, relative to the bottom surface of the structure. This way, the beam focus, $\beta$, is rotated inwards to cast more LED energy directly below the structure. In other words, by canting the LED inwards, less LED energy is directed outside of a grow zone (e.g., plant apparatus 120).

Figure 3:
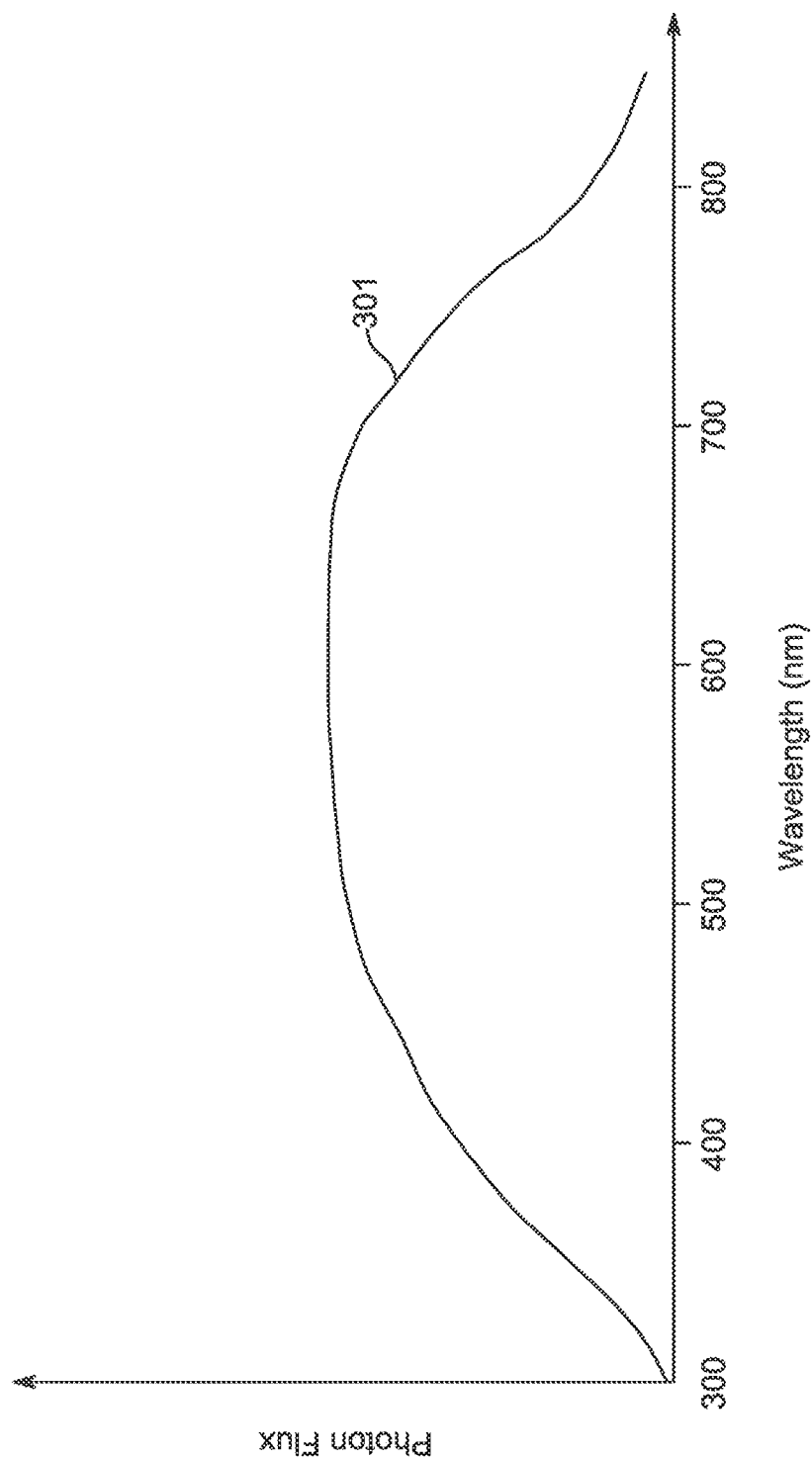
FIGS. 3-6 show illustrative energy profiles, according to some embodiments.

FIG. 3 shows an illustrative diagram showing photon flux profile of natural sunlight 301 across the visible spectrum, according to an embodiment. As shown, natural sunlight 301 has a relatively broad spectrum of photon flux across the entire visible spectrum.

Figure 4:
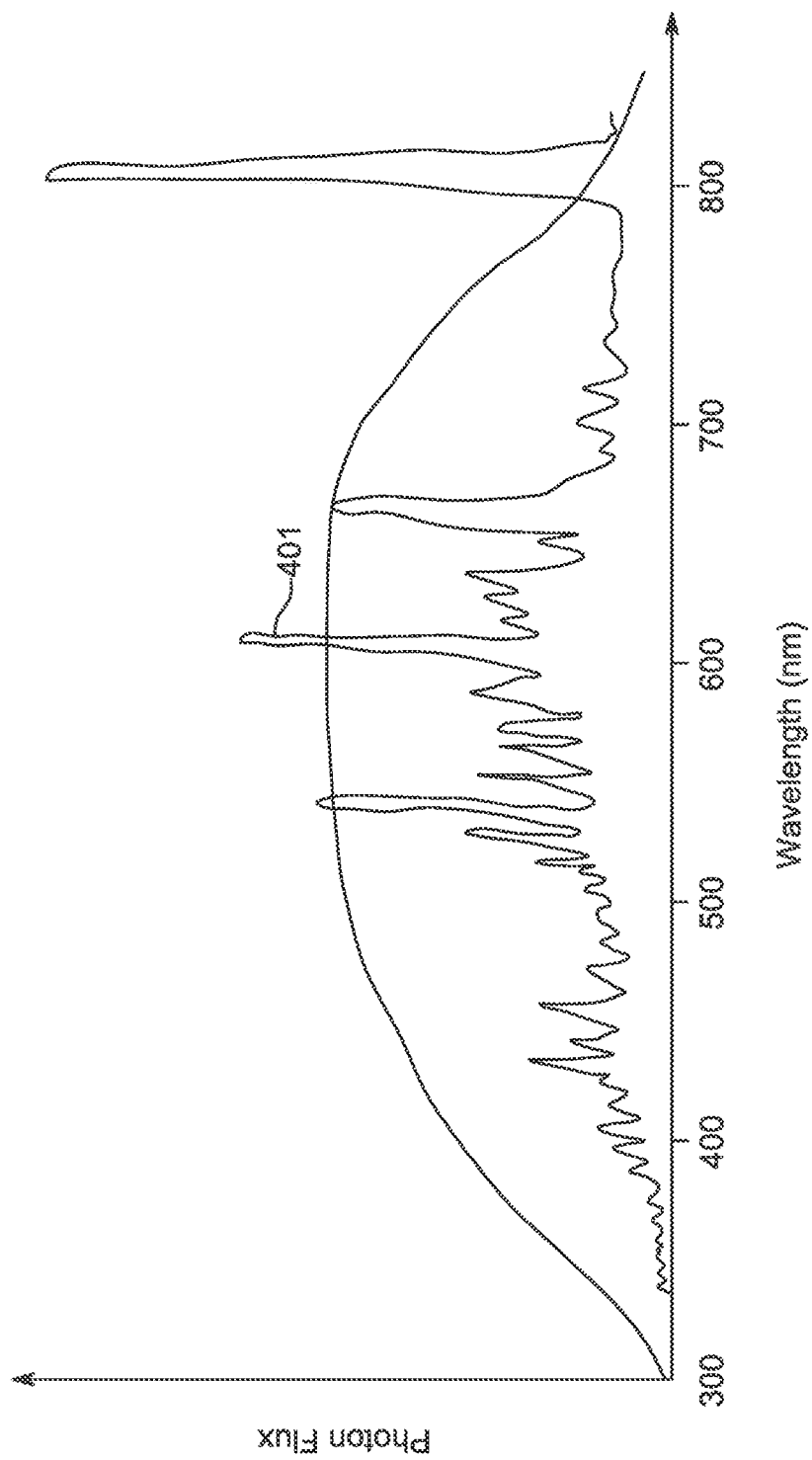

FIG. 4 shows the profiles of natural sunlight 301 and lamp 401. For example, lamp profile 402 may be the photon flux provided by lamp 111. As shown, lamp profile 402 is relatively spiky does not exhibit the broad spectrum of natural sunlight 301. In addition, the magnitude of the photon flux at various wavelengths is relatively low compared to the same wavelengths of natural light (e.g., especially around 400 nm and 700 nm wavelengths). Embodiments described herein compensate for deficiencies in the lamp profile by controlling output of the LEDs.

Figure 5:
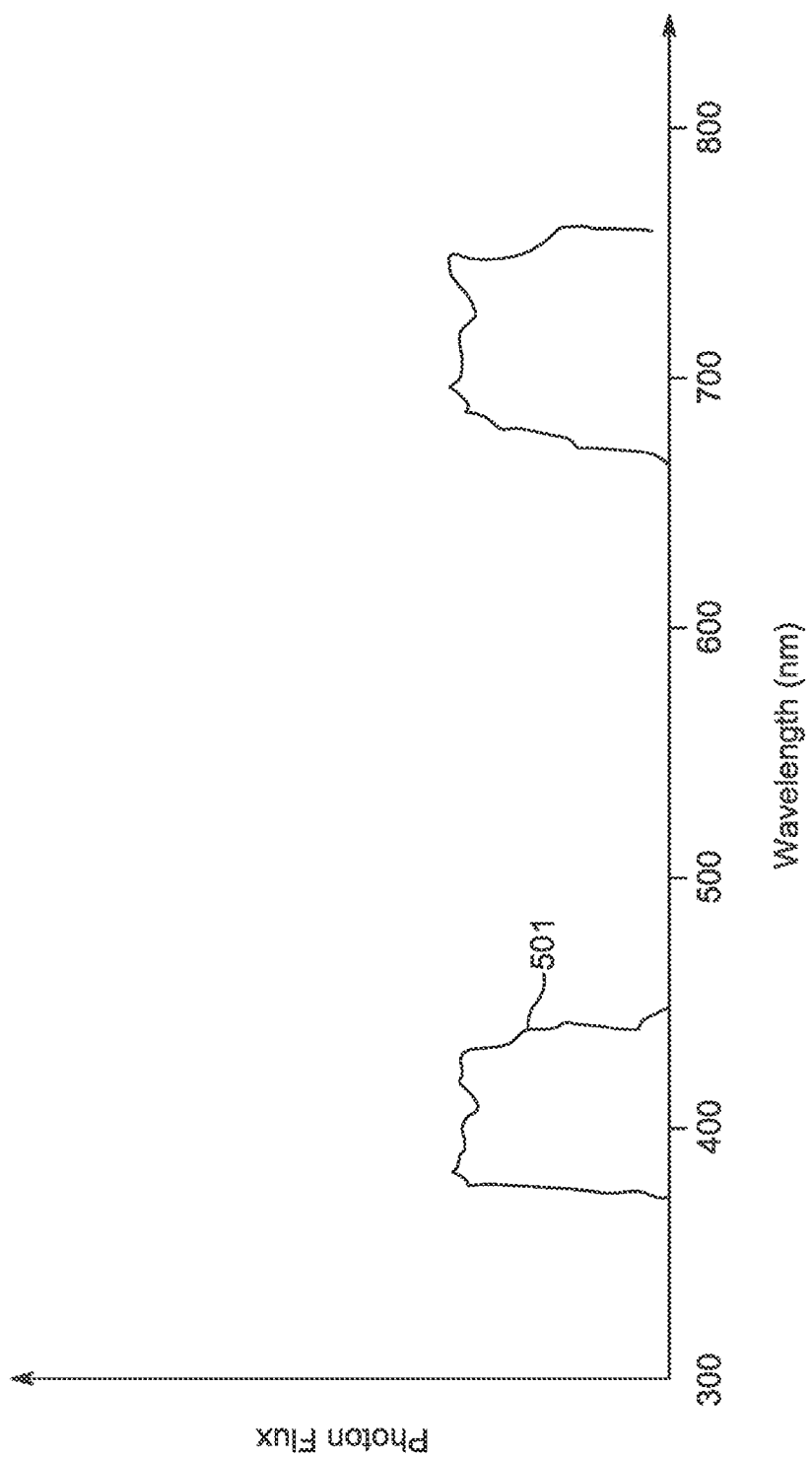

FIG. 5 shows an illustrative LED profile 501 according to an embodiment. As shown, the LEDs are controlled to provide energy at wavelengths straddling 400 nm and 700 nm. The LEDs may be controlled to provide energy at these wavelengths to compensate for the relative deficiency of the same wavelengths in the lamp profile.

Figure 6:
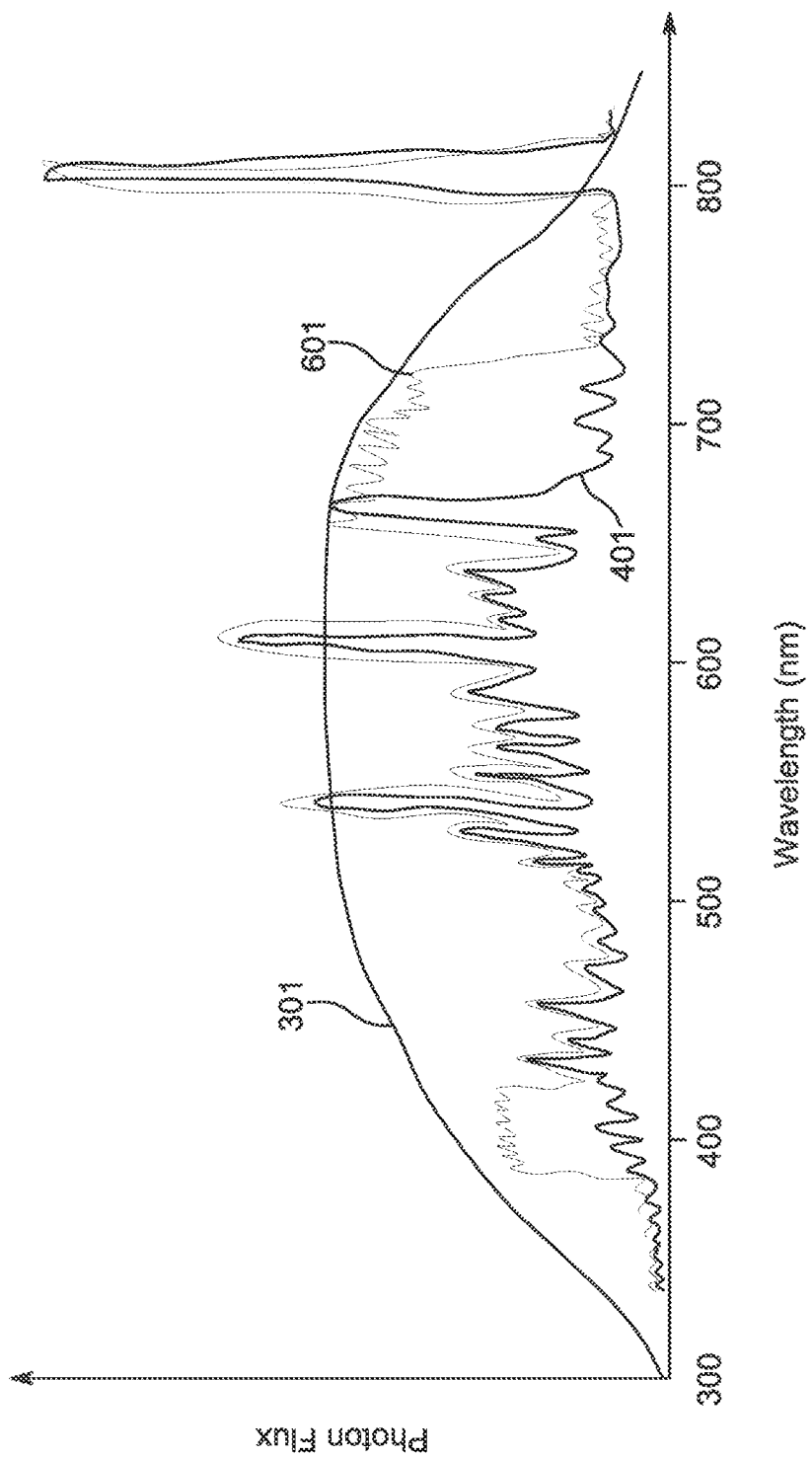

FIG. 6 shows illustrative combined energy profile 601 according to an embodiment. Combined energy profile 601 represents the combination of lamp profile 401 and LED profile 501 (not shown). As shown, combined energy profile 601 more closely resembles the natural light profile than either the lamp profile 301 or LED profile 501. In addition, combined energy profile 601 illustrates how the addition of the LEDs enhanced the photon flux of the lamp profile at the 400 nm and 700 nm wavelengths.

Energy management profiles may be utilized by light systems according to various embodiments to maximize growth and product yield. Each energy management profile may provide a custom energy control profile that includes appropriate adjustments to LED energy output, LED energy intensity, and lamp energy intensity over the duration of the plant grow cycle (e.g., from seedling to mature plant). In addition, each energy management profile may be specific to the type of lamp the LEDs are working in concert with because each lamp type may exhibit a different lamp profile.

Any processes described with respect to FIGS. 1-6, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A system comprising:
    an optical sensor;
    a high intensity discharge (HID) lamp;
    a plurality of light emitting diodes (LEDs); and
    control circuitry in operative communication with the optical sensor, HID lamp, and the LEDs, the control circuitry is operative to:
        process data obtained from the optical sensor; and
        control operation of at least one of the HID lamp and the LEDs based on the processed data; activate the HID lamp, wherein the HID lamp has a first energy profile; and control output of the LEDs to supplement the first energy profile so that a combination of the HID lamp and the LEDs produces a second energy profile.

2. The system of claim 1, wherein the control circuitry is operative to:
    vary the output of the LEDs over time to optimize the second energy profile for growth of plant matter.

3. The system of claim 1, wherein the control circuitry is operative to perform at least one action based on data obtained by the optical sensor.

4. The system of claim 3, wherein the at least one action is instructing a vertical positioning system to adjust an elevation of the light system with respect to a ground plane.

5. The system of claim 3, wherein the at least one action is to adjust the output of the LEDs to alter the second energy profile.

6. The system of claim 1, wherein the optical sensor is a camera.

7. A method for operating a light system comprising an optical sensor, a high intensity discharge (HID) lamp, and a plurality of light emitting diodes (LEDs), the method comprising:
    processing data obtained from the optical sensor; and
    controlling operation of at least one of the HID lamp and the LEDs based on the processed data;
    activating the HID lamp, wherein the HID lamp has a first energy profile; and controlling output of the LEDs to supplement the first energy profile so that a combination of the HID lamp and the LEDs produces a second energy profile.

8. The method of claim 7, further comprising varying the output of the LEDs over time to optimize the second energy profile for growth of plant matter.

9. The method of claim 7, further comprising varying the output of the LEDs based on the processed data obtained from the optical sensor.

10. A light system comprising:
    a high intensity discharge (HID) lamp;
    a plurality of light emitting diodes (LEDs); and
    control circuitry in operative communication with the HID lamp and the LEDs, the control circuitry is operative to:
        activate the HID lamp, wherein the HID lamp has a first energy profile; and
        control output of the LEDs to supplement the first energy profile so that a combination of the HID lamp and the LEDs produces a second energy profile, wherein the LEDs further increase a magnitude of at least one wavelength portion of the first energy profile.

11. The system of claim 10, wherein the control circuitry is operative to:
    vary the output of the LEDs over time to optimize the second energy profile for growth of plant matter.

12. The system of claim 10, wherein the control circuitry is operative to adjust a power level of the HID lamp.

13. The system of claim 10, wherein the control circuitry is operative to adjust a power level of each one of the plurality of LEDs.

14. The system of claim 10, wherein the control circuitry is operative to adjust an energy frequency output of each one of the plurality of LEDs.

15. The system of claim 10, wherein the second energy profile more more closely resembles an energy profile of the Sun than any energy profile independently generated by the HID and the LEDs.

16. The system of claim 10, further comprising a support member, and wherein the HID lamp is secured to a center portion thereof and the LEDs are secured to an outer portion thereof.

* * * * *